United States Patent
Kelly et al.

(10) Patent No.: US 6,839,103 B2
(45) Date of Patent: Jan. 4, 2005

(54) ELLIPTICALLY POLARIZING PLATE AND LIQUID CRYSTAL DISPLAY

(75) Inventors: Jack Kelly, Stow, OH (US); Tatiana Sergan, Silver Lake, OH (US); Marina Lavrentovich, Kent, OH (US); Yuuichi Nishikouji, Ibaraki (JP); Tadayuki Kameyama, Ibaraki (JP)

(73) Assignee: Kent State University, Kent, OH (US)

( * ) Notice: Subject to any disclaimer, the term of this patent is extended or adjusted under 35 U.S.C. 154(b) by 0 days.

(21) Appl. No.: 10/085,973

(22) Filed: Feb. 28, 2002

(65) Prior Publication Data

US 2003/0164920 A1 Sep. 4, 2003

(51) Int. Cl.$^7$ ............................................. G02F 1/1335
(52) U.S. Cl. ......................... 349/98; 349/96; 349/101; 349/102; 349/103; 349/99
(58) Field of Search ........................... 349/98, 96, 101, 349/102, 103, 99

(56) References Cited

U.S. PATENT DOCUMENTS

| | | | |
|---|---|---|---|
| 5,196,953 A | * 3/1993 | Yeh et al. | 349/119 |
| 5,504,603 A | 4/1996 | Winker et al. | 359/73 |
| 5,568,290 A | * 10/1996 | Nakamura | 349/96 |
| 5,825,542 A | * 10/1998 | Cobb et al. | 359/487 |

FOREIGN PATENT DOCUMENTS

| | | | |
|---|---|---|---|
| EP | 0 838 713 | 10/1997 | G02F/1/1335 |
| EP | 1 156 349 | 2/2000 | G02B/5/30 |

OTHER PUBLICATIONS

Partial translation into English of Japanese Patent Publication No. 7–35924.
Partial translation into English of Japanese Patent Publication No. 10–123506.
Partial translation into English of Japanese Patent Publication No. 2000–304930.

* cited by examiner

Primary Examiner—Tarifur R. Chowdhury
Assistant Examiner—George Y. Wang
(74) Attorney, Agent, or Firm—Hudak, Shunk & Farine Co. LPA

(57) ABSTRACT

An elliptically polarizing plate, comprising a polarizer, a first optical anisotropic layer having positive refractive index anisotropy and an optical axis of the anisotropy that is tilted, and a second optical anisotropic layer having negative refractive index anisotropy and an optical axis that is tilted, have accurate retardation compensation of a liquid crystal cell, and the liquid crystal display maintains a display contrast having a sufficient visibility when the viewing angle is changed and which does not generate colorization.

15 Claims, 1 Drawing Sheet

Comparison Example

ELLIPTICALLY POLARIZING PLATE AND LIQUID CRYSTAL DISPLAY

BACKGROUND OF THE INVENTION

1. Field of the Invention

The present invention relates to an elliptically polarizing plate and a liquid crystal display (LCD), which maintains a sufficient display contrast in all azimuths and which has a display performance that does not generate a color shift.

2. Description of the Prior Art

Currently, a mainstream method of a general liquid crystal display is a thin-film transistor (TFT) LCD using a twisted nematic (TN) liquid crystal. In this method, there is available an advantage in that a response speed is high, and a high contrast can be obtained. However, when a display panel using a TN liquid crystal is seen from a tilt angle to direction of a normal line, the contrast is remarkably lowered, and a gray scale reversion is generated in which the gray scale display is reversed. The display panel has a characteristic such that a viewing angle is extremely narrow. In the usage of a large-scale monitor and a television or the like, a high contrast, a wide viewing angle, and a small change in the display color number resulting from a viewing angle are demanded. Consequently, in the case the TN mode TFT-LCD is used in such usage, a retardation film for compensating for the viewing angle is indispensable.

As a retardation film, a stretched birefrigent polymer film has been conventionally used. Recently, it is proposed that a compensation sheet having a compensation anisotropy layer formed of liquid crystal molecule on a transparent substrate be used, instead of the compensation sheet comprising the stretched birefrigent film. Since there are various alignment forms in the liquid crystal molecule, it becomes possible to realize optical properties, which cannot be obtained with the conventional stretched birefrigent polymer film, by using the liquid crystal molecule.

As the above retardation film for the viewing angle compensation film, for example, there is available a wide view film (trade name WV film) manufactured by Fuji Film Co., Ltd. which uses a discotic liquid crystal having negative anisotropy. An object of this retardation film is to improve viewing angle properties in the state of black display, namely, in the voltage application state. That is, in the voltage application state, the liquid crystal molecule in the liquid crystal cell shows positive refractive index anisotropy having an optical axis, which is tilted from the glass substrate. The retardation film comprising the liquid crystal molecule having an optical axis tilted from a normal line and negative refractive index anisotropy to compensate the retardation of the refractive index anisotropy.

Furthermore, as another retardation film for viewing angle compensation, there is available a HN film manufactured by NISSEKI MITSUBISHI Co., Ltd. which uses a rod-like nematic liquid crystal having a positive refractive index anisotropy. An object of this retardation film is to primarily compensate for an intermediate gray scale display state and the film comprises a liquid crystal molecule having an optical axis tilted from the normal line direction of the film and positive refractive index anisotropy.

Furthermore, Japanese Unexamined Patent Publication No. HEI 7-306406, Japanese Unexamined Patent Publication No. HEI 7-35924 and Japanese Unexamined Patent Publication No. HEI 10-123506 describe a retardation film laminating a compensation layer having an optical axis tilted from the film normal line and compensation layer having positive uniaxial properties and an optical axis within the film plane, so that each main refractive index directions orthgonally, using a rod-like nematic liquid crystal in order to compensate for a viewing angle of a display contrast and a gray scale display state.

Also, Japanese Unexamined Patent Publication No. HEI 2000-304930 describes that the liquid crystal cell can be accurately compensated by using together a discotic liquid crystal and a rod-like liquid crystal, which have completely different optical properties. As to the state of the optical anisotropic layer with respect to the TN mode in particular, it is described that the discotic liquid crystal molecules are tilt aligned, then the rod-like liquid crystal can be optically accurately compensated when the average tilt angle is set to less than 5°.

Above described, it becomes possible to optically compensate for the liquid crystal cell to some degree by using a compensation sheet in which the liquid crystal molecules are tilt aligned on the transparent substrate. However, in the case where only such optical compensation films are used, the display contrast is remarkably lowered when these sheets are tilted at approximately 60° or more from the panel normal line. In particular, in the case where the rod-like nematic liquid crystal molecule is used, the optical compensation is conducted with the liquid crystal molecule having the same optical anisotropy as the molecule used in the liquid crystal cell in the TN mode. As a consequence, it is theoretically inappropriate to compensate for the orientation state in which an optical axis of the rod-like nematic liquid crystal cell has a tilt approximate to the normal line direction with respect to the cell surface in the black state. When the viewing angle is changed, the black sink cannot be maintained so that a bluish black is provided. Furthermore, in the case where the discotic liquid crystal molecule is used, colorization to the yellow color can be observed when the viewing angle is changed in the white state, namely in the case of no application of voltage.

Furthermore, a film combination of the tilt orientation layer of the rod-like (i.e., "calamitic") nematic liquid crystal molecule and the retardation layer having positive uniaxial properties is known. With respect to the film, it has been made clear as a result of the inspection of these reports that a conspicuous colorization is generated by a change in the viewing angle. Thus, only a practically unfavorable liquid crystal can be obtained.

Furthermore, in the case where the discotic liquid crystal and the rod-like nematic liquid crystal are used together, the viewing angle properties of the contrast are widened when the average tilt angle is less than 5°. However, the colorization phenomenon is conspicuous when the viewing angle in the white display is changed so that the problem of the deterioration in the display quality cannot be solved.

In this manner, as the retardation film used in the viewing angle compensation of the TN mode TFT-LCD, a birefrigent retardation film is used in which a tilt orientation layer of the discotic or rod-like nematic liquid crystal layer is formed on the transparent substrate. However, no retardation film is observed in which the total viewing angle properties such as a display contrast and the colorization are not remarkably improved with accurate retardation compensation.

An object of the present invention is to provide an elliptically polarizing plate, with accurate retardation compensation of the liquid crystal cell, for a liquid crystal display that maintains a display contrast having a sufficient visibility when the viewing angle is changed and which does not generate colorization.

And an object of the present invention is to provide an A liquid crystal display using the above-mentioned elliptically polarizing plate.

SUMMARY OF THE INVENTION

The invention relates to an elliptical polarizing plate having a polarizer, a first optical anisotropic layer having a positive refractive index anisotropy and an optical axis of anisotropy which is tilted, and a second optical anisotropic layer having a negative refractive index anisotropy which is tilted. Preferably, the layers are laminated in the forgoing order, the first optical layer is a rod-like liquid crystal and the second layer is a discotic liquid crystal, and the optical axis of the second layer is orthogonal to the first layer.

The invention is also provided wherein the elliptical polarizing plate is included in a liquid crystal display which has a wide viewing angle, and can optionally include the polarizing plate on one side of the liquid crystal, and another optical compensation layer on the opposite side of the liquid crystal cell. The other optical compensation layer has a refractive index of nx>ny=nz, where the refractive indexes in two directions within the plane is set to nx and ny, and the refractive index in the thickness direction is set to nz. This liquid crystal display has a sufficient display contrast in a viewing angle direction in all azimuth and displays only a small change in color from the front when the viewing angle is changed. This liquid crystal display is realized using an asymmetrical configuration in which the liquid crystal cell has an optical anisotropic layer on a first side and an optical anisotropic layer having different characteristics on the other side.

A liquid crystal display having a wide viewing angle can be realized applying an elliptically polarizing plate comprises a polarizer, a first optical anisotropic layer having positive refractive index, and having an optical axis which is tilted with respect to the plane of the polarizer and a second optical anisotropic layer having negative refractive index, and an optical axis which is tilted with respect to the plane of the polarizer. Namely a liquid crystal display having a sufficient display contrast in a viewing angle direction in all azimuth and having a characteristic such that a change in display color from the front is small when the viewing angle is changed, by using an elliptically polarizing plate. In particular, a liquid crystal display having a more sufficient in a viewing properties can be realized applying an other elliptically polarizing plate having a different optical anisotropic layer from said elliptically polarizing plate is configured on opposite side of the liquid crystal cell.

DESCRIPTION OF THE PREFERRED EMBODIMENTS

Figure 1:
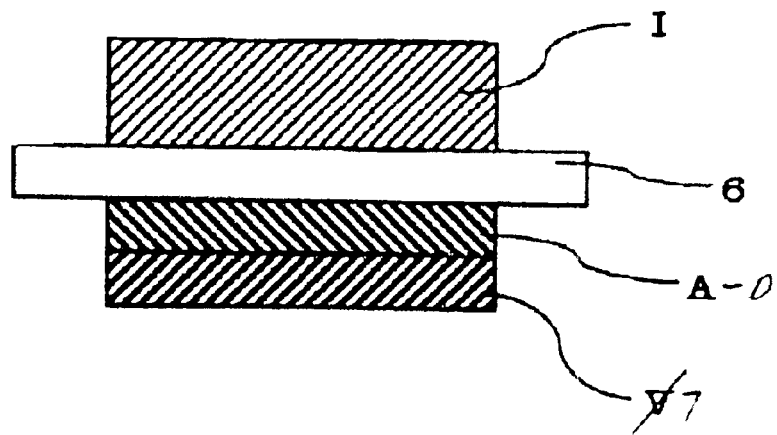
FIG. 1 is a sectional drawing of liquid crystal panel of Example.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 $\mu$m is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. The film may also be dipped in aqueous solutions, such as boric acid and potassium iodide, if needed. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A polarizer is used as a polarizing plate having a protective layer on one side or both sides of the polarizer. The protective layer may be preferable, formed of materials with outstanding transparency, mechanical strength, heat stability, moisture cover property, isotropy, etc. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective layer, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a layer comprising resins of heat curing type or ultraviolet curing type, such as acrylics type, urethane type, acrylics urethane type and epoxy type and silicone type type may be mentioned. Generally, thickness of the protective layer is no more than 500 $\mu$m, preferably 1 to 300 $\mu$m and more preferably 5 to 200 $\mu$m.

As a protective layer, cellulose type polymers, such as triacetyl cellulose, is preferable by reason of polarization characteristics and durability etc. Especially triacetyl cellulose is preferable. In addition, when protective layers are prepared on both sides of the polarizer, the protective layers consisting of the same polymer material may be used on the front and the backside, or the protective layers consisting of different polymer materials etc. may be used. The above-mentioned polarizer and the protective layer are usually adhered via an aqueous pressure sensitive adhesive etc. As an aqueous pressure sensitive adhesive, polyvinyl alcohol type adhesives, gelatin type adhesives, vinyl type latex type adhesives, aqueous polyurethane adhesives, aqueous polyester adhesives, etc. may be mentioned.

As the above-mentioned protective layer, a layer with a hard coat layer and various processing aiming for antireflection, sticking prevention and diffusion or anti glare may be used.

A hard coat processing is applied for the purpose of protecting the surface of the polarization plate from damage, and this hard coat layer may be formed by a method in which, for example, a curable coated layer with excellent hardness, slide property etc. is added on the surface of the protective layer using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective layer using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 $\mu$m, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

A first optical anisotropic layer has positive refractive index anisotropy (the refractive index in the optical axis direction is larger than the refractive index in the perpendicular direction) and an optical axis, which is tilted. The layer can be obtained by applying shear stress or the like to an optically transparent polymer material. As the transparent polymer material, the materials forming above-mentioned transparent protective layer are exemplified. Furthermore, as a material having positive refractive index anisotropy, a rod-like nematic liquid crystal molecule can be used. A thickness of the first optical anisotropic layer is not particularly limited, usually 0.5 to 500 $\mu$m is preferable, 1 to 200 $\mu$m is more preferable.

In particular, with respect to the first optical anisotropic layer, a retardation $Re=(nx-ny)\times d$ within the plane is preferably 10 to 1000 nm, where the refractive indexes in two directions within the plane is set to nx and ny (nx>ny), the refractive index in the thickness direction is set to nz and d(nm) is set to thickness. The retardation is more preferably 30 to 600 nm. The retardation is most preferably 40 to 500 nm. A retardation $Rth=(nx-nz)\times d$ in the direction of the thickness is preferably −400 to 900 nm. The retardation is more preferably −300 to 500 nm. The retardation is most preferably −200 to 400 nm.

A second optical anisotropic layer has negative refractive index anisotropy (the refractive index in the optical axial direction is smaller than the refractive index in the perpendicular direction) and an optical axis, which is tilted. The layer can be obtained by applying shearing stress or the like to the optically transparent polymer material. As the transparent polymer material, the materials forming above-mentioned transparent protective layer are exemplified. Furthermore, as a material having a negative refractive index, a discotic liquid crystal molecule can be used. A thickness of the second optical anisotropic layer is not particularly limited, usually 0.5 to 500 $\mu$m is preferable, 1 to 200 $\mu$m is more preferable.

In particular, with respect to the second optical anisotropic layer, a retardation $Re=(nx-ny)\times d$ within the plane is preferably 1 to 500 nm, where the refractive indexes in two directions within the plane is set to nx and ny (nx>ny), the refractive index in the thickness direction is set to nz and d(nm) is set to thickness. The retardation is more preferably 2 to 400 nm. The retardation is most preferably 5 to 200 nm. A retardation $Rth=(nx-nz)\times d$ in the direction of the thickness is preferably 0 to 700 nm, The retardation is more preferably 10 to 600 nm. The retardation is most preferably 20 to 500 nm.

In a case the liquid crystal molecule (the discotic liquid crystal molecule and the rod-like nematic liquid crystal molecule) is used forming the first or second optical anisotropic layer, the tilt alignment state of the liquid crystal molecule can be controlled by the molecule structure, by the type of the alignment film and by the use of an additive agent (for example, a plasticizer, a binder and a surface lubricating agent).

The tilt state of the liquid crystal molecule (the discotic liquid crystal molecule and the rod-like nematic liquid crystal molecule) may have an uniformly tilt, which dose not change along with the distance with the plane. In particular, preferably, the tilt state of the liquid crystal molecule changes along with a distance between the liquid crystal and the plane. When the tilt state is assumed for a positive or a negative uniaxial optical indicatrix, an angle made between the optical axis and the direction of normal line to the plane optical anisotropic layer is regarded as an average tilt angle. In a case the optical anisotropic layer have positive uniaxial, the average tilt angle is preferably 20° to 85°, more preferably 30° to 80°, most preferably 40° to 75°. In a case the optical anisotropic layer have negative uniaxial, the average tilt angle is preferably 5° to 70°, more preferably 7° to 60°, most preferably 10° to 50°.

Furthermore, in the first or second optical anisotropic layer, the alignment of the liquid crystal molecule forming is fixed. A low molecule liquid crystal or a high molecule liquid crystal is used as the liquid crystal molecule. A method for fixing is not particularly limited, for example, as the liquid crystal molecule, the acrylic liquid crystal molecule having reactive double bond at the end is used, and is fixed with the polymerization reaction applying UV radiation or the like. It is possible to fix the liquid crystal molecule alignment by using a polymer binder.

The first and second optical anisotropic layer is usually formed on the transparent substrate. The following can be given as a form for forming respective optical anisotropic layers.

(1) In the case where the first or the second optical anisotropic layer is formed on the transparent substrate As a method for forming an optical anisotropic layer of the liquid crystal molecule on the transparent substrate, in the beginning an alignment film is formed on the optical anisotropic transparent substrate, and a liquid crystal molecule is applied on the alignment film to provide a tilt alignment. Furthermore, after the optical anisotropic alignment film is aligned on a different alignment substrate, the optical anisotropic layer is transcribed by using the transparent substrate on the adhesive and the pressure-sensitive adhesive.

(2) In the case where the first and the second optical anisotropic layer is formed on one side of the transparent substrate After the first optical anisotropic layer is formed on the transparent substrate by the method described above (1), the layer is allowed to function as an alignment film, the second optical anisotropic layer is formed. Furthermore, the alignment film is formed again, which enables forming the second optical anisotropic layer. Furthermore, after the first and the second optical anisotropic layers are formed on a different alignment substrate, the first and the second optical anisotropic layer can be manufactured on the transparent substrate by the transcription by using the adhesive and the pressure-sensitive adhesive.

(3) In the case shere the first or the second optical anisotropic layer is formed on each surface of the transparent substrate As described in (1), the first and the second anisotropic layers can be formed on each surface of the transparent substrate by using the alignment film and the transcription.

As the transparent substrate, which is used no limitation, is set when the transparent substrate is an optically transparent substrate. The material of the transparent substrate is exemplified the same material of the transparent protective layer applied polarizer. The transparent substrate may have either an optically isotropy or anisotropy. That is, there is a case in which the optical anisotropy of the transparent substrate is added to the optical anisotropy of the optical anisotropic layer so as to correspond (optically compensate) to the optical anisotropy of the liquid crystal cell. In such a case, the transparent substrate preferably having an optical uniaxial properties or optical biaxial properties is preferable. A thickness of the transparent substrate is usually 0 to 500 $\mu$m. In the case of the optical uniaxial substrate, the substrate may be either optically positive (the refractive index in the optical axis direction is larger than the refractive index in the perpendicular direction) or optically negative (the refractive index in the optical axial direction is smaller than the refractive index in the perpendicular direction). In the case of the optical biaxial substrate, preferably the refractive indexes nx, ny and nz in the above mathematical expression provides all different values (nx≠ny≠nz). Preferably, the retardation Re=(nx−ny)×d in the plane of the optical anisotropy transparent substrate is 10 to 100 nm. More preferably, the retardation is 15 to 300 nm. The retardation Rth=(nx−nz)×d in the direction of the thickness of the optical anisotropy transparent substrate is preferably 0 to 500 nm, and more preferably 0 to 400 nm, most preferably 0 to 300 nm.

Furthermore, the alignment film can be provided with such means as rubbing treatment of the organic compound (preferably, polymer), tilted vapor deposition of inorganic compound, the formation of a layer on which a micro groove is formed, and an accumulation of organic compound by means of a Langmuir-Blodgett technique (an LB film). Furthermore, an alignment film in which alignment function is generated with the addition of an electric field, the addition of the magnetic field, or the light radiation. The rubbing treatment is conducted by rubbing the surface of the polymer layer in a same direction several times with paper or cloth. A polarizing UV or the like is known in the light radiation.

An elliptically polarizing plate of the present invention comprises the polarizer, the first optical anisotropic layer and the second optical anisotropic layer. A laminating order of the polarizer, the first optical anisotropic layer and the second optical anisotropic layer is not particularly limited. Preferably they are laminated in this order. The transparent substrate plate may be used as the transparent protective film applied to the polarizer. The following can be given as a lamination state example.

(1) A polarizing plate/pressure-sensitive adhesive/transparent substrate/first optical anisotropic layer/pressure-sensitive adhesive/transparent substrate/second optical anisotropic layer (2) A polarizer/transparent substrate/first optical anisotropic layer/pressure-sensitive adhesive/transparent substrate/second optical anisotropic layer (3) A polarizing plate/pressure-sensitive adhesive/transparent substrate/first optical anisotropic layer/second optical anisotropic layer (4) A polarizer/transparent substrate/first optical anisotropic layer/second optical anisotropic layer (5) A polarizing plate/pressure-sensitive adhesive/first optical anisotropic layer/transparent substrate/second optical anisotropic layer Furthermore, with respect to the configuration of the transmission axis of the polarizer and each of the optical axis direction of the first optical anisotropic layer or the second optical anisotropic layer, it is desired that the directions are either parallel or orthogonal to each other. Furthermore, it is desired that the tilt directions of the first and the second optical axis are orthogonal.

As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

In addition, in the present invention, ultraviolet absorbing property may be given to each layer forming the above-mentioned elliptically polarizing plate, using a method of adding UV absorbents, such as salicylic acid ester type compounds, benzophenol type compounds, benzotriazol type compounds, cyano acrylate type compounds, and nickel complex salt type compounds.

When the above elliptically polarizing plate is set on a liquid crystal cell of TN mode, more effect can be obtained by providing the elliptically polarizing plate on one side of the cell, and having an other compensation layer with a different structure on the opposite side of the liquid crystal cell. A surface of the elliptically polarizing plate to attach the liquid crystal cell is not particularly limited. In a case the above-mentioned exemplified elliptically polarizing plate (1) to (5), it is preferable that the second optical anisotropic layer side is attached to the liquid crystal cell. The other compensation layer on the opposite side of the liquid crystal cell prepared the elliptically polarizing plate, an other elliptically polarizing plate comprising the polarizing plate and the retardation plate, with uniaxial properties or biaxial properties, obtained by stretching polymer film and a rod-like nematic or a discotic liquid crystal molecule which are not tilt aligned may be used.

An optically transparent plate is desirable as the retardation plate. In the plate, synthetic polymer (for example, polycarbonate, polystyrene, polyethersulfone, polyacrylate, polymetacrylate, norbornen type resin, polystyrene, and styrene-acryl copolymer) is used.

As a characteristic of the retardation plate, in the case of nx>ny=nz, (nx−ny)×d=10 to 500 nm is desirable. Furthermore, 20 to 400 nm is more desirable. In the case of nx=ny>nz, (nx−ny)×d=10 to 500 nm is desirable. Furthermore, 20 to 400 nm is more desirable. In the case of nx>ny>nz, (nx−ny)×d=1 to 300 nm and (nx−nz)×d=50 to 600 nm are desirable. Furthermore, (nx−ny)×d=10 to 200 nm and (nx−nz)×d=70 to 300 nm are more desirable. In the case of nx<ny=nz, (nx−ny)×d=−1 to −200 nm is desirable and furthermore, −5 to −150 nm is desirable.

At least one layer of the retardation plate is provided. When the two or more retardation plate is laminated, the retardation plates are laminated and are configured each a refractive index maximum azimuth in the plane orthogonal.

Besides, although there is especially no limitation about an optical layer laminated in practical use, for example, one or more optical layers that may be used for formation of liquid crystal display, such as a reflection plate and a semitransparent plate, etc. may be used. Especially, a reflection type polarization plate or a semitransparent type polarization plate in which a reflection plate or a semitransparent reflector is further laminated on an elliptically polarization plate or a circularly polarization plate, or a polarization plate in which a brightness enhanced film is further laminated on the polarization plate may be mentioned.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a semitransparent type polarizing plate may be obtained by preparing the above-mentioned reflective layer as a semitransparent type reflective layer, such as a half-mirror etc. that reflects and transmits light. A semitransparent type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a semitransparent type polarization plate. That is, the semitransparent type polarization plate is useful to obtain of a liquid crystal display of the type that saves energy of light sources, such as a back light, in a well-lighted atmosphere, and can be used with a built-in light source if needed in a comparatively dark atmosphere etc.

The polarization plate with which a polarization plate and a brightness enhanced film are adhered together is usually used being prepared in a backside of a liquid crystal cell. A brightness enhanced film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhanced film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhanced film further reversed through the reflective layer prepared in the backside and forces the light re-enter into the brightness enhanced film, and increases the quantity of the transmitted light through the brightness enhanced film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhanced film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhanced film does not enter the light with the polarizing direction absorbed by the polarizer into the polarizer but reflects the light once by the brightness enhanced film, and further makes the light reversed through the reflective layer etc. prepared in the backside to re-enter the light into the brightness enhanced film. By this above-mentioned repeated operation, only when the polarization direction of the light reflected and reversed between the both becomes to have the polarization direction which may pass a polarizer, the brightness enhanced film transmits the light to supply it to the polarizer. As a result, the light from a backlight may be efficiently used for the display of the picture of a liquid crystal display to obtain a bright screen.

The suitable films are used as the above-mentioned brightness enhanced film. Namely, multilayer thin film of a dielectric substance; a laminated film that has the characteristics of transmitting a linearly polarized light with a predetermined polarization axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhanced film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhanced film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhanced film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a semitransparent type polarization plate is combined with above described retardation plate respectively.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

EXAMPLE

<First Optical Anisotropic Layer>

A NH film manufactured by Nisseki-Mistubishi Co., Ltd was used. The film had a tilted aligned layer made of rod-like nematic liquid crystal molecules on the cellulose polymer film (triacetyl cellulose: TAC), which is the transparent substrate.

The NH film was separated to the tilted aligned layer and the transparent substrate. And these characteristics were measured with the KOBRA-21ADH manufactured by Oji Measuring Machine Co., Ltd. The transparent substrate had a retardation value: $\Delta nd=(nx-ny)\times d=4$ nm, $Rth=(nx-nz)\times d=50$ nm. The other side, the tilted aligned layer had a retardation value: $\Delta nd=95$ nm $Rth=67$ nm, the average tilt angle $\theta=60°$, when an incidence ray angle was vane$-50$ to $50°$ to the direction at the optical axis tilted.

<Second Optical Anisotropic Layer>

A WV film manufactured by Fuji Film Co., Ltd was used. The film had a tilted aligned layer made of discotic liquid crystal molecules on the cellulose polymer film (triacetyl cellulose: TAC), which is the transparent substrate.

The WV film was separated to the tilted aligned layer and the transparent substrate. And these characteristics were measured with the KOBRA-21ADH manufactured by Oji Measuring Machine Co., Ltd. The transparent substrate had a retardation value: $\Delta nd=(nx-ny)\times d=12$ nm, $Rth=(nx-nz)\times d=100$ nm. The other side, the tilted aligned layer had a retardation value: $\Delta nd=30$ nm, $Rth=150$ nm, the average tilt angle $\theta=17°$, when an incidence ray angle was varied $-50$ to $50°$ to the direction at the optical axis tilted.

<Polarizing Plate>

After a polyvinyl alcohol having a thickness of 75 μm is dyed in a solution containing iodine, the film was uniaxially stretched by six times between rolls having a different circumferential speed in a solution containing boric acid to provide a polarizer. On both sides of the polarizer, triacetyl cellulose film was laminated with an adhesive to provide the polarizing plate.

<Method for Manufacturing Elliptically Polarizing Plate>

Example 1 to 5

The NH film was laminated to the polarizing plate so that the polarizing transparent axis and the optical axis tilt direction orthgonally with each other via an acryl series pressure sensitive adhesive. Furthermore, a WV film was laminated on the NH film so that the optical axis tilt directions of the NH film and the WV film orthgonally with each other with the result that an elliptically polarizing plate (I) was provided.

Comparison Example 1

The polycarbonate was subjected to uniaxial stretch, and a retardation film with $(nx-ny)\times d=95$ nm at $\lambda=590$ nm was obtained. The retardation film was laminated to the polarizing plate via an acryl series pressure sensitive adhesive so that the transmission axis of the polarizing plate and the stretch axis of the retardation film become parallel to each other. Furthermore, an elliptically polarizing plate (IV) was manufactured by laminating the WV film to the retardation film via the acryl series pressure sensitive type adhesive so that the tilt direction of the optical axis of the WV film were orthogonal with the stretch axis of the retardation film.

Comparison Example 2

The polycarbonate was subjected to biaxial stretch, so that a retardation film with $(nx\times ny)\times d=30$ nm and $(nx-nz)\times d=160$ nm at $\lambda=590$ nm was obtained. The NH film was laminated on the polarizing plate via an acryl series pressure sensitive adhesive, so that the transmission axis of the polarizing plate and the optical axis tilt direction of the NH film becomes parallel to each other. Furthermore, an elliptically polarizing plate (V) was manufactured by laminating the retardation film to the NH film via the acryl series pressure sensitive type adhesive so that the delay phase axis (a refractive index maximum azimuth in the plane) of the retardation film were orthogonal with the optical axis tilt direction of the NH film.

<Method for Manufacturing Liquid Crystal Panel>

Shown in FIG. 1, according to Table 1, the elliptically polarizing plates (I), (IV), and (V) were attached to the liquid crystal cell of TN mode (6). The elliptically polarizing plates (I), (IV) were attached at the WV film side, the elliptically polarizing plate (V) was attached at the retardation film side. On t e opposite side of the liquid crystal cell, according to Table 1, the polarizing plates (7) were attached to the retardation plates (A) to (CD) described below. In structure 2', the polarizing plate (7) was attached to the two retardation plates (A), which are laminated and are configured each the delay phase axis of th retardation (a refractive index maximum azimuth in the plane) were orthogonal. The acryl series pressure sensitive type adhesives were used to attach the polarizing plate etc.

<Method for Manufacturing Retardation Plate>

Polycarbonate was used and $nx>ny=nz$ characteristic is provided with uniaxial stretch with the result that a retardation plate (A) with $(nx-ny)\times d=50$ nm at $\lambda=590$ nm was manufactured. Furthermore, with biaxial stretch, a retardation plate (B) with $nx=ny>nz$ and $(nx-nz)\times d=100$ nm at $\lambda=590$ nm was manufactured. Furthermore, a retardation plate (C) with $nx>ny>nz$, $(nx\times ny)\times d=70$ nm and $(nx-nz)\times d=150$ nm at $\lambda=590$ nm was manufactured. Furthermore, a retardation plate (D) with a characteristic of $nx<ny=nz$ which provides the minimum refractive index in the stretch direction and with $(nx-ny)\times d=-30$ nm was manufactured by subjecting the material of the styrene-acryl copolymer to uniaxial stretch.

TABLE 1

| | Embodiment | | | | | | Comparison Example | |
|---|---|---|---|---|---|---|---|---|
| Structure | 1 | 2 | 2' | 3 | 4 | 5 | 1 | 2 |
| Elliptically Polarizing Plate | I | I | I | I | I | I | IV | V |
| TN cells | ← | ← | ← | ← | ← | ← | ← | ← |
| Retardation Plate | None | A | A | B | C | D | C | C |
| Polarizing Plate | ← | ← | ← | ← | ← | ← | ← | ← |

Comparison Example 3

A TAC film/a polarizer/a WV film were laminated in this order to manufacture an elliptically polarizing plate (II). A substrate TAC of the WV film was used as a protective layer of the polarizer. The acryl series pressure sensitive type adhesives were used to laminate each layer.

Comparison Example 4

A TAC film/a polarizer/a NH film were laminated in this order to manufacture an elliptically polarizing plate (III). A substrate TAC of the NH film was used as a protective layer of the polarizer. The acryl series pressure sensitive type adhesives were used to laminate each layer.

<Method for Manufacturing Liquid Crystal Panel>

Figure 2:
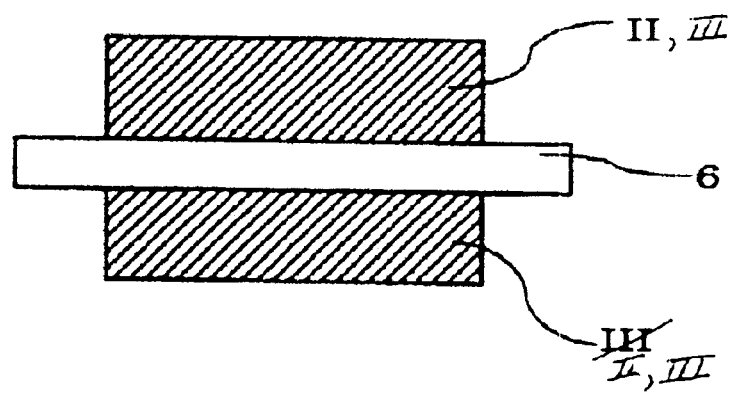
FIG. 2 is a sectional drawing of liquid crystal panel of Comparison Example.

Shown in FIG. 2, according to Table 2, the elliptically polarizing plates (II) and (III) were attached to both sides of the liquid crystal cell of TN mode (6). The elliptically polarizing plate (II) was attached at the WV film side, the elliptically polarizing plate (III) was attached at the NH film side. The acryl series pressure sensitive type adhesives were used to attach the elliptically polarizing plate.

TABLE 2

| | Comparison Example | |
|---|---|---|
| Structure | 3 | 4 |
| Elliptically Polarizing Plate | II | III |
| TN cells | ← | ← |
| Elliptically Polarizing Plate | II | III |

As the above-obtained panels, the viewing angle characteristic was measured. Incidentally, EZContrast manufactured by ELDIM Company was used for the measurement.

Result is shown Table 3.

TABLE 3

|  |  | Contrast (10 or more) | | | | Color Shift (Right and Left viewing angles. White Display) |
|---|---|---|---|---|---|---|
|  |  | Upper | Lower | Right | Left |  |
| Embodiment | 1 | 53° | 80° | 80° | 80° | No color shift |
|  | 2 | 58° | 75° | 80° | 80° | No color shift |
|  | 2' | 62° | 60° | 80° | 80° | No color shift |
|  | 3 | 55° | 60° | 80° | 80° | No color shift |
|  | 4 | 60° | 45° | 80° | 80° | No color shift |
|  | 5 | 60° | 80° | 80° | 80° | No color shift |
| Comparison Example | 1 | 50° | 30° | 50° | 80° | No color shift |
|  | 2 | 40° | 36° | 60° | 59° | No color shift |
|  | 3 | 55° | 60° | 65° | 65° | Yellowish |
|  | 4 | 47° | 80° | 75° | 76° | No color shift |

As a result of the evaluation, a wide viewing angle panel can be obtained both in the contrast and the color shift in the embodiments. However, in the comparison examples, no characteristic can be obtained which satisfies both the contrast and the color shift.

What is claimed is:

1. An elliptically polarizing plate comprising a laminate of: a polarizer having a first planar side and an opposing planar side and comprising a polarizer film having a thickness of from about 5 to about 80 $\mu$m, and optionally including a protective layer having a thickness which is less than about 500 $\mu$m;

a first anisotropic optical layer having a first planar side and an opposing second planar side, said layer being made from a first material that is a calamitic liquid crystal which has a thickness of from about 0.5 to about 500 $\mu$m and optionally includes a substrate having thickness of from about 0 to about 500 $\mu$m, said first anisotropic optical layer having a positive refractive index anisotropy and an optical axis that is tilted relative to the plane of the polarizer and which has a retardation Re=(nx−ny)×d within the plane of the layer of from about 10 to about 1000 nm and a retardation Rth=(nx−nz)×d in the direction of the thickness of from about −400 to about 900 nm wherein the effective indexes in two directions within the plane is set to nx and ny, the refractive index in the thickness direction is set to nz, and th thickness is d;

a second anisotropic optical layer having a first planar side and an opposing second side and said layer being made from a second material that is a discotic liquid crystal which has a thickness of from about 0.5 to about 500 $\mu$m and optionally includes a substrate having a thickness of from about 0 to about 500 $\mu$m, and said second anisotropic optical layer having a negative refractive index anisoptropy and an optical axis that is tilted relative to the plane of the polarizer and which has a retardation Re=(nx−ny)×d within the plane of the layer of from about 1 to about 500 nm and a retardation Rth=(nx−nz)×d in the direction of the thickness of from about 0 to about 700 nm; and one of the planar sides of the polarizer being laminated directly or by means of an intermediate adhesive layer to the first planar side of the first anisotropic optical layer and the second planar side of the second anisotropic layer being laminated directly or by means of an intermediate adhesive layer to the first planar side of the second anisotropic layer, and the second layer being oriented so that the optical plane of the second layer is substantially orthogonal to the optical plane of the first optical layer.

2. The elliptically polarizing plate according to claim 1, wherein the plate comprises at least the polarizer, and the first and the second optical layers and the layers are laminated in this order.

3. The elliptically polarizing plate according to claim 1, wherein the first optical anisotropic layer is formed of a calamitic nematic liquid crystal.

4. The elliptically polarizing plate according to claim 1, wherein the second optical anisotropic layer is formed of a discotic liquid crystal.

5. A liquid crystal display comprising a liquid crystal cell of twisted nematic mode, wherein an elliptically polarizing plate according to claim 1 is provided on each side of the liquid crystal cell.

6. The liquid crystal display comprising the liquid crystal cell of twisted nematic mode, wherein the elliptically polarizing plate according to claim 1 is provided on one side of the liquid crystal cell and an other optical compensation layer is provided on the opposite side of the liquid crystal cell.

7. An elliptitcally polarizing plate as set forth in claim 1 wherein the first optical layer has an average angle of tilt of between about 20° and about 85°.

8. An elliptitcally polarizing plate as set forth in claim 7 wherein the first optical layer has an average angle of tilt of between about 30° and about 80°.

9. An elliptitcally polarizing plate as set forth in claim 8 wherein the first optical layer has an average angle of tilt of between about 40° and about 75°.

10. An elliptitcally polarizing plate as set forth in claim 9 wherein the first optical layer has an average angle of tilt of between about 5° and about 70°.

11. An elliptitcally polarizing plate as set forth in claim 10 wherein the first optical layer has an average angle of tilt of between about 7° and about 60°.

12. An elliptitcally polarizing plate as set forth in claim 11 wherein the first optical layer has an average angle of tilt of between about 10° and about 50°.

13. A liquid crystal display comprising a liquid crystal cell having a first side laminated directly or indirectly to an elliptically polarizing plate comprising a polarizer film having a thickness of from about 5 to about 80 $\mu$m, and optionally including a protective layer having a thickness which is less than about 500 $\mu$m;

a first anisotropic optical layer having a first planar side and an opposing second planar side, said layer being made from a first material that is a calamitic liquid crystal which has a thickness of from about 0.5 to about 500 $\mu$m and optionally includes a substrate having thickness of from about 0 to about 500 $\mu$m, said first anisotropic optical layer having a positive refractive index anisotropy and an optical axis that is tilted relative to the plane of the polarizer and which has a retardation Re=(nx−ny)×d within the plane of the layer of from about 10 to about 1000 nm and a retardation Rth=(nx−nz)×d in the direction of the thickness of from about −400 to about 900 nm wherein the refractive indexes in two directions within the plane is set to nx and ny, the refractive index in the thickness direction is set to nz, and the thickness is d;

a second anisotropic optical layer having a first planar side and an opposing second side and said layer being made from a second material that is a discotic liquid crystal which has a thickness of from about 0.5 to about 500 μm and optionally includes a substrate having a thickness of from about 0 to about 500 μm, and said second anisotropic optical layer having a negative refractive index anisoptropy and an optical axis that is tilted relative to the plane of the polarizer and which has a retardation Re=(nx−ny)×d within the plane of the layer of from about 1 to about 500 nm and a retardation Rth=(nx−nz)×d in the direction of the thickness of from about 0 to about 700 nm; and one of the planar sides of the polarizer being laminated directly or by means of an intermediate adhesive layer to the first planar side of the first anisotropic optical layer and the second planar side of the second anisotropic layer being laminated directly or by means of an intermediate adhesive layer to the first planar side of the second anisotropic layer, and the second layer being oriented so that the optical plane of the second layer is substantially orthogonal to the optical plane of the first optical layer.

14. A liquid crystal display as set forth in claim 13 further comprising a compensation layer laminated directly or indirectly to a second side of the liquid crystal cell.

15. A liquid crystal display as set forth in claim 14 further comprising a reflective layer.

* * * * *